United States Patent [19]
Hermanns

[11] Patent Number: 6,002,230
[45] Date of Patent: Dec. 14, 1999

[54] WINDING DRUM DRIVE OF A CHEESE-PRODUCING TEXTILE MACHINE

[75] Inventor: Ferdinand-Josef Hermanns, Erkelenz, Germany

[73] Assignee: W Schlafhorst AG & Co., Moenchengladbach, Germany

[21] Appl. No.: 09/134,969

[22] Filed: Aug. 17, 1998

[30] Foreign Application Priority Data

Aug. 16, 1997 [DE] Germany .............. 197 35 581

[51] Int. Cl.$^6$ .................. G05B 13/04; H02P 6/08
[52] U.S. Cl. ............ 318/564; 318/615; 318/254; 318/431
[58] Field of Search .................. 318/138, 254, 318/430, 431, 439, 563, 564, 615

[56] References Cited

U.S. PATENT DOCUMENTS

| | | | |
|---|---|---|---|
| 4,434,458 | 2/1984 | Kazahaya | 364/138 |
| 4,514,672 | 4/1985 | O'Gwynn | 318/616 |
| 5,583,404 | 12/1996 | Karwath et al. | |
| 5,656,908 | 8/1997 | Rehm | 318/608 |

FOREIGN PATENT DOCUMENTS

| | | |
|---|---|---|
| 0 638 988 A2 | 8/1994 | European Pat. Off. . |
| 37 17 749 A1 | 12/1988 | Germany . |
| 37 31 984 A1 | 4/1989 | Germany . |
| 40 29 409 A1 | 3/1992 | Germany . |
| 43 36 312 A1 | 4/1995 | Germany . |
| 195 31 692 A1 | 4/1996 | Germany . |
| 195 03 492 A1 | 8/1996 | Germany . |
| 196 30 986 A1 | 2/1997 | Germany . |

OTHER PUBLICATIONS

Regelungstechnik, Author Otto Follinger Huthig Buch Verlag Heideberg, Germany, 1990.

Robust digital position control of brushless DC motor with adaptive load torque observer Authors: J.–S. Ko, J.–H. Lee, and M.–J. Youn, IEE–Proc.–Electr. Power Appli., vol. 141, No. 2, Mar. 1994.

*Primary Examiner*—Bentsu Ro
*Attorney, Agent, or Firm*—Kennedy Covington Lobdell & Hickman LLP

[57] ABSTRACT

In the course of regulating an electronically commutated d.c. motor as the drive motor of a winding device of a textile machine, the resolution of known angular rotation sensing systems is insufficient to assure a jerk-free drive of the drum at low rpm. It is therefore proposed by the invention to introduce a so-called Luenberger observer into the regulating circuit for regulating the motor rpm in which the signals of the angular rotation sensing system for the commutation of the motor are generated.

7 Claims, 2 Drawing Sheets

WINDING DRUM DRIVE OF A CHEESE-PRODUCING TEXTILE MACHINE

FIELD OF THE INVENTION

She invention relates to a winding drum drive of a cheese-producing textile machine, having an electrically commutatable d.c. drive motor for the winding drum and a regulating device for processing an output value of a sensor monitoring the angular rotation of the drum for regulating the rotational speed (rpm) of the rotor.

BACKGROUND OF THE INVENTION

In bobbin winding machines, it is known, for example from German Patent Publication DE 43 36 312 A1, to drive the take-up bobbin by means of a friction roller, i.e., a so-called winding drum, which simultaneously also places the yarn onto the bobbin. In this apparatus the winding drum of each winding station has its own drive, which is triggered by the winding station computer. Often the winding drum drives are designed as electronically commutatable d.c. motors, since such drives are simple in construction and therefore relatively cost-effective. The commutation of the drive current of such d.c. motors is controlled by means of Hall sensors.

Similar Hall sensors are also employed for detecting the rpm of the winding drum drives. Specifically, a sensor system for recognizing the angular rotation of the winding drum provides information representing or indicative of the rpms of the winding drum, which is converted into predetermined winding drum rpm with the aid of known control methods, for example by using a PID regulating device.

However, with these known regulating systems, the regulation of the rotational speed (rpm) of the winding drum always becomes more difficult when the winding drum rotates at a low speed, which is the case in its start-up phase, for example. Because of their relatively coarse angular resolution below a defined rpm, these known sensor systems are no longer capable at low drum speeds (rpm) of providing sufficiently exact information regarding the angular position of the rotor of the drive motor, so that a smooth jerk-free winding drum rotation often is no longer provided. If, for example, a Hall sensor system with two Hall sensors, offset by 90 degrees, and a magnetic ring with, for example, 32 pairs of magnetic poles is available, an angular resolution, and therefore the detection of the rotating movement of the rotor of the drive motor, is only possible in steps of approximately 2.8 degrees.

As indicated by the curve a in FIG. 1, such a relatively coarse angular resolution is insufficient for the desired regulation of the current commutation of a drive motor in order to assure a uniform start-up as well as reverse running during the search for the yarn end of the dynamic system of the drive and winding drum. It can be seen from the curve a in FIG. 1 that the known regulating systems produce a step-by-step acceleration instead of a linear increase of the angular velocity. Such jerky running of the winding drum is disruptive, in particular during the start-up of the winding drum after a yarn splicing operation, since this leads to uneven yarn tension, which has a negative effect both on the yarn quality and the bobbin structure. Also, disruptions in the winding operation can occur in the course of slow running of the winding drum, for example during the search for the yarn preparatory to a splicing operation, because the non-uniform running of the winding drum leads to loop formation in the yarn running up on the cheese, for example.

Although it would be possible to prevent the non-uniform running of the drive motor, and therefore of the winding drum, at low rotational speeds (rpm) by the employment of a sensor system with an appropriately high angular resolution, the costs associated with such highly resolving systems is relatively large. Therefore these systems are quite expensive, wherein the costs greatly rise with the attainable accuracy of the angular resolution.

SUMMARY OF THE INVENTION

It is therefore an object of the present invention to provide a cost-effective winding drum drive which assures smooth, non-jerky, true running both in the start-up phase and at low rotational speeds.

Briefly summarized, the present invention accomplishes this objective in a cheese-producing textile machine having a yarn winding drum, an electrically commutatable d.c. motor for driving the winding drum, the motor having a rotatable rotor, and a regulating device for processing an output value of a sensor system representing the angular rotation of the rotor, and the rpm of the rotor. The regulating device comprises an actual control segment comprising a roughly resolving angular rotation sensor system, a simulated model control segment, comprising a simulated system of a drive and a winding drum, a switch connecting the actual and model control segments in parallel to switchably control delivery to the model control segment of signals of the roughly resolving angular rotation sensor system for continuous matching with the actual control segment at least one state variable of the model control segment being used as a control variable.

The winding drum drive in accordance with the invention has the advantage that, in spite of the use of a cost-effective, roughly resolving angular rotation sensor, a jerk-free running of the winding drum is assured even at low rotational speeds of the drive motor. By providing the control circuit for regulating the drive motor speed with a model which simulates the operation of the system of controlling the drive motor and winding drum based on actual operational inputs (herein referred to as the "actual control segment"), it is assured that the drive has no tendency for jerky operation even at low rotational speeds, i.e. at rpms below a minimum rpm level. By connecting the model control segment to the output of the actual control segment, the model is continuously matched to the actual speed progression of the drive system.

The model control segment of the drive and winding drum system is preferably constructed in digital form in a computer of the bobbin winding machine or the respective winding station on the basis of known drive and winding drum data. However, it is also possible to apply this model control segment along externally in an analog manner.

For regulating the rpm of the drive motor of the winding drum, the model control segment provides the regulating device with the state variables between the measuring impulses of the angular rotation sensor system, which the latter cannot provide.

By means of the employment of a switch it is possible to uncouple the model control segment from the regulating circuit, when there is a sufficiently high impulse density of the roughly resolving angular rotation sensor system wherein a state variable from the actual control segment is directly supplied to the regulating device. When the operating speed of the winding drum and the drive falls below a minimum threshold value, the model control segment becomes effective again, while the direct coupling of the output of the actual control segment with the regulating device is interrupted.

The model control segment can operate, for example, in the manner of a so-called Luenberger observer or estimator. Such observers or estimators are known and are extensively described in the technical publication "Regelungstechnik" [Regulating Technology] by Otto Föllinger, 1985, Dr. Alfred Huithig, publ., Heidelberg. Relevant discussion regarding the above mentioned "Luenberger observer" are made on pages 340 et seq. of this technical publication.

The same manipulated variables are provided to the model control segment as to the actual drive control segment. A value is generated by combining at a summing point the output signal of the model control segment with the signal generated by the angular rotation sensor system based on its actual measurements, by means of which the dynamic behavior of the model control segment can be matched to that of the actual control segment. The model states are subsequently supplied to the speed regulating device of the drive system, for example a status regulating device. This regulating device then affects the actual control segment on the basis of the model states, i.e., the added Luenberger observer makes it possible to make the interior conditions which are present in the actual control segment available to the regulating device with sufficient accuracy. A higher angular resolution of the angle pickup system is not required. Signal processing in the regulating circuit is a function of the employed technology and can be performed digitally or analog without having an effect on the essence of the invention.

DETAILED DESCRIPTION OF THE PREFERRED EMBODIMENT

Figure 2:
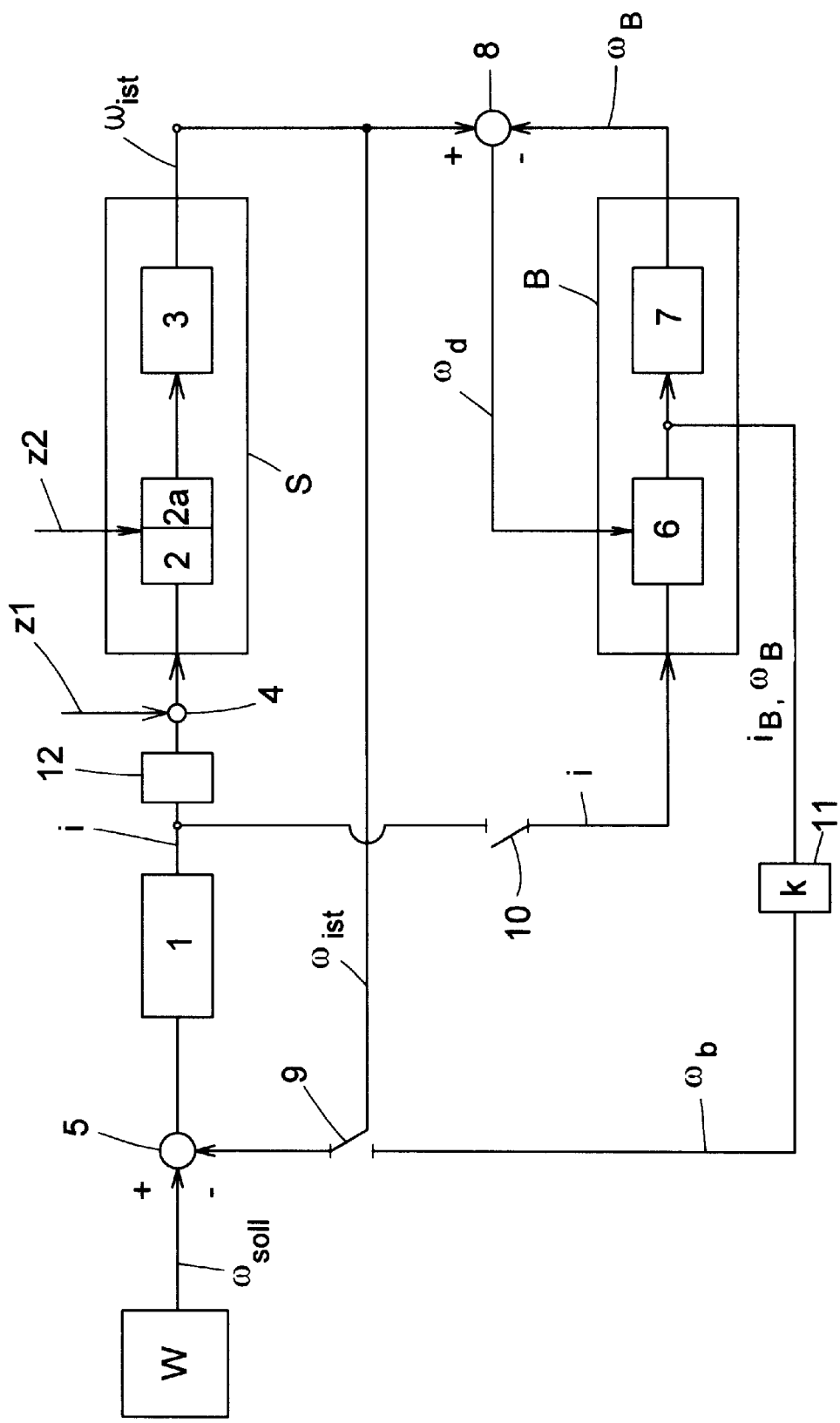
FIG. 2 is a block circuit diagram of the device of the invention.

With reference initially to FIG. 2, at sufficiently high rotational speeds (rpm) of a d.c. motor, a simple regulating circuit is sufficient for regulating the drive current i, wherein the actual angular velocity $\omega_{ist}$ of the drive is supplied to the regulating device 1 as the controlled variable. The regulating device 1 receives the command variable $\omega$, the bobbin velocity, by appropriate settings of a command value transducer W. The drive and the winding drum constitute the main components of the actual control segment S. Disturbance variables z1 and z2 have an effect on the system of the drive and winding drum. One of the disturbance variables z1 acting from the outside on the segment S at the summing point 4 is, for example, the error of the current end stage 12 which performs, for example, an impulse width modulation. All interior disturbance variables of the system 2 of drive and winding roller act as further disturbance variables z2, such as the interior friction of the motor, the mass inertia of the rotor and the drum as well as the start-up conditions under which the system is initiated. The combination 3 of the interior conditions (angle, angular velocity, angular acceleration) of the system 2 of drive and winding drum results in the actual angular velocity $\omega_{ist}$ as the output value.

This actual angular velocity $\omega_{ist}$ is switched as the controlled variable on the summing point 5 upstream of the regulating device 1. During normal winding operations the return of the controlled variable $\omega_{ist}$ to the regulating device 1 takes place via a switch 9 in the switching position represented.

As already explained, the impulse sequence of the roughly resolving angular rotation sensor system determining the actual angular velocity is too inaccurate at low speeds (rpm), for example during the start-up or of a winding operation or during reverse running in the course of a yarn searching operation on the cheese surface for unwinding the yarn end in connection with the repair of a yarn break. Interior conditions of the actual system, such as current and angular velocity, can only be inaccurately detected, so that a perfect regulation of the electronically commutated d.c. motor, and therefore a jerk-free run of the winding drum is no longer provided.

In accordance with the invention, the existing regulating circuit is detoured via a model control segment, the Luenberger observer B in this case, such as represented in FIG. 2. Thus the direct signal path of the control variable angular velocity $\omega_{ist}$ to the summing point 5 is interrupted at the switch 9 and the observer B is switched into the actual regulating segment S as a parallel segment. Among other things, the manipulated variable i, the respective drive current for the winding drum operation, coming from the regulating device 1 is provided to this model control segment B when a switch 10 in the signal path of the manipulated variable i to the observer B is closed. Thus, by providing the same manipulated variable i, the behavior of the actual segment S is simulated in a computer of the observer B by means of an appropriate calculating model.

The model control segment B comprises the simulated system 6 of the drive and the winding drum, and the combination 7 of the interior states of the simulated system 6. The interior states which can be taken from the interior system 6, the current iB as well as the angular velocity $\omega_B$ are model states which are conducted via a feedback vector 11, in which a multiplication with constants takes place, as the control variable $\omega_b$ to the summing point 5 and therefore to the regulating device 1, where they are used for regulating the actual winding drum drive of the segment S.

The combination 7 of the interior states of the simulated system 6 of drive and winding drum provides the simulated angular velocity $\omega_B$, which is inversely applied to the actual angular velocity $\omega_{ist}$ at the summing point 8. During the observer operation the resulting value $\omega_d$ is supplied to the simulated drive/winding drum system 6, or respectively the observer B, and in turn the dynamic behavior of the simulated system 6 is matched to the behavior of actual drive/winding drum system 2.

The model control segment, i.e. the observer B, in this case preferably remains switched into the regulating circuit until the coarsely resolving angular rotation sensor system delivers such a dense signal sequence because of a sufficiently high rotational speed (rpm), that a jerk-free running of the drive of the winding drum occurs.

The observer B can also remain continuously switched into the control circuit, provided the computer of the model control segment B is fast enough. However, because of the high signal density of the angular rotation at higher rpm, this is not necessary for a jerk-free operation.

Figure 1:
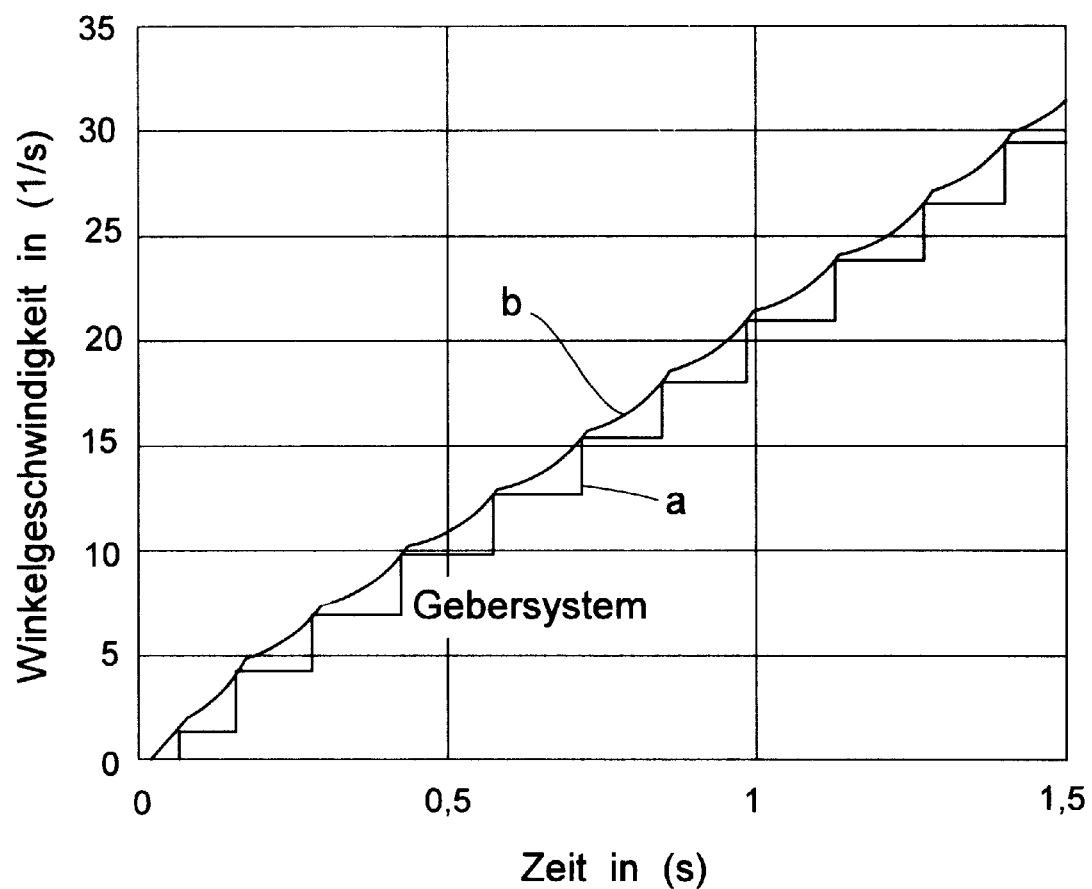
FIG. 1 is a graph representing the progression of the running of the drive motor both without and with the use of the device of the present invention.

The result of this regulation is represented by the curve b in FIG. 1. As can be seen from the curve b, the integration of an observer B into the regulation of the winding drum drive leads to a smoothing of the signals, so that in place of a stepped acceleration of the rotor of the drive motor (curve a), the increase of the angular velocity $\omega_{ist}$ of the drive takes place in a hardly noticeable wave shape, as represented in curve b. Here, the curve b is composed of incremental small steps.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. In a cheese-producing textile machine having a yarn winding drum, an electrically commutatable d.c. motor for driving the winding drum, the motor having a rotatable rotor, and a regulating device for processing an output value of a sensor system representing the angular rotation of the rotor, the regulating device comprising a regulating circuit including an actual control segment (S) comprising a roughly resolving angular rotation sensor system (2a), a simulated model control segment (B) comprising a simulated system (6) of a drive and a winding drum, a switch connecting the actual and model control segments in parallel to switchably control delivery to the model control segment of signals of the roughly resolving angular rotation sensor system (2a) for continuous matching with the actual control segment (S), at least one state variable $\omega_b$ of the model control segment being used as a control variable.

2. The regulating device in accordance with claim 1, characterized by a switch (9) for separating the simulated model control segment (B) from the regulating circuit for regulating the rpm of the rotor of the drive motor.

3. The regulating device in accordance with claim 2, wherein the switch (9) is a threshold value switch, which separates the connection of the regulating circuit to the simulated model control segment (B) above a predeterminable value of angular velocity ($\omega$).

4. The regulating device in accordance with claim 1, wherein the simulated model control segment (B) comprises a Luenberger observer.

5. The regulating device in accordance with claim 1, wherein the output of the actual control segment (S) and the corresponding output of the simulated model control segment (B) are inversely switched to a summing point (8), and a sum produced thereat is supplied to an input of the simulated model control segment (B) for the dynamic matching of the model control segment to the actual control segment (S).

6. The regulating device in accordance with claim 1, wherein angular velocities ($\omega_{ist}$, $\omega_b$) of the actual control segment (S) or of the simulated model control segment (B) are supplied to a summing point (5), which is inversely supplied with a command angular velocity ($\omega_{soll}$) connected by its output to the regulating device (1).

7. The regulating device in accordance with claim 1, wherein the input of the model control segment (B) is connectable to the output of the regulating device (1).

* * * * *